Sept. 6, 1960   J. R. MARCUS ET AL   2,951,655
AUTOMATIC CAPACITOR WINDING MACHINE
Filed Jan. 30, 1957   6 Sheets-Sheet 1

INVENTORS
J. R. MARCUS
G. P. McGRAW JR.
BY R. P. Miller
ATTORNEY

Sept. 6, 1960 J. R. MARCUS ET AL 2,951,655
AUTOMATIC CAPACITOR WINDING MACHINE
Filed Jan. 30, 1957 6 Sheets-Sheet 2
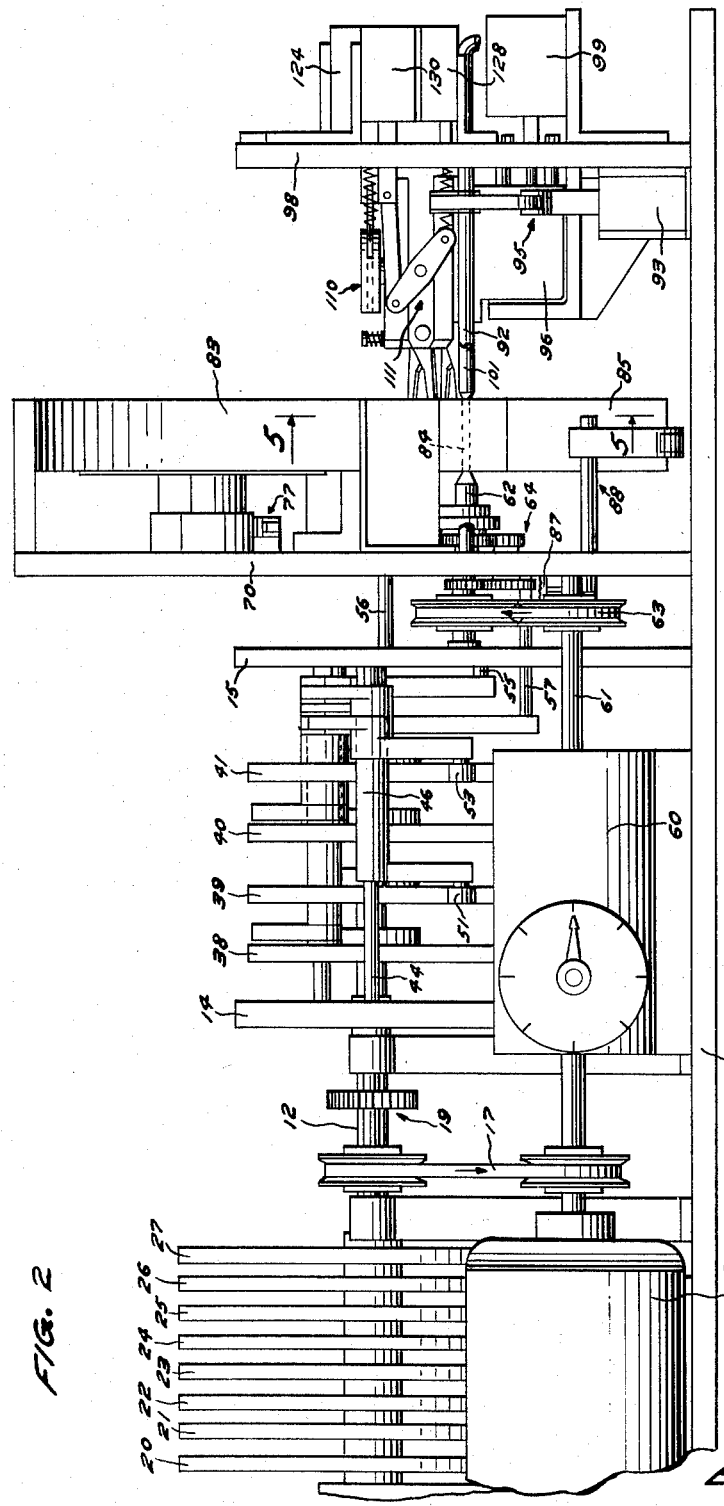
INVENTORS
J.R. MARCUS
G.P. McGRAW JR.
BY R.P. Miller
ATTORNEY Sept. 6, 1960 J. R. MARCUS ET AL 2,951,655
AUTOMATIC CAPACITOR WINDING MACHINE
Filed Jan. 30, 1957 6 Sheets-Sheet 3
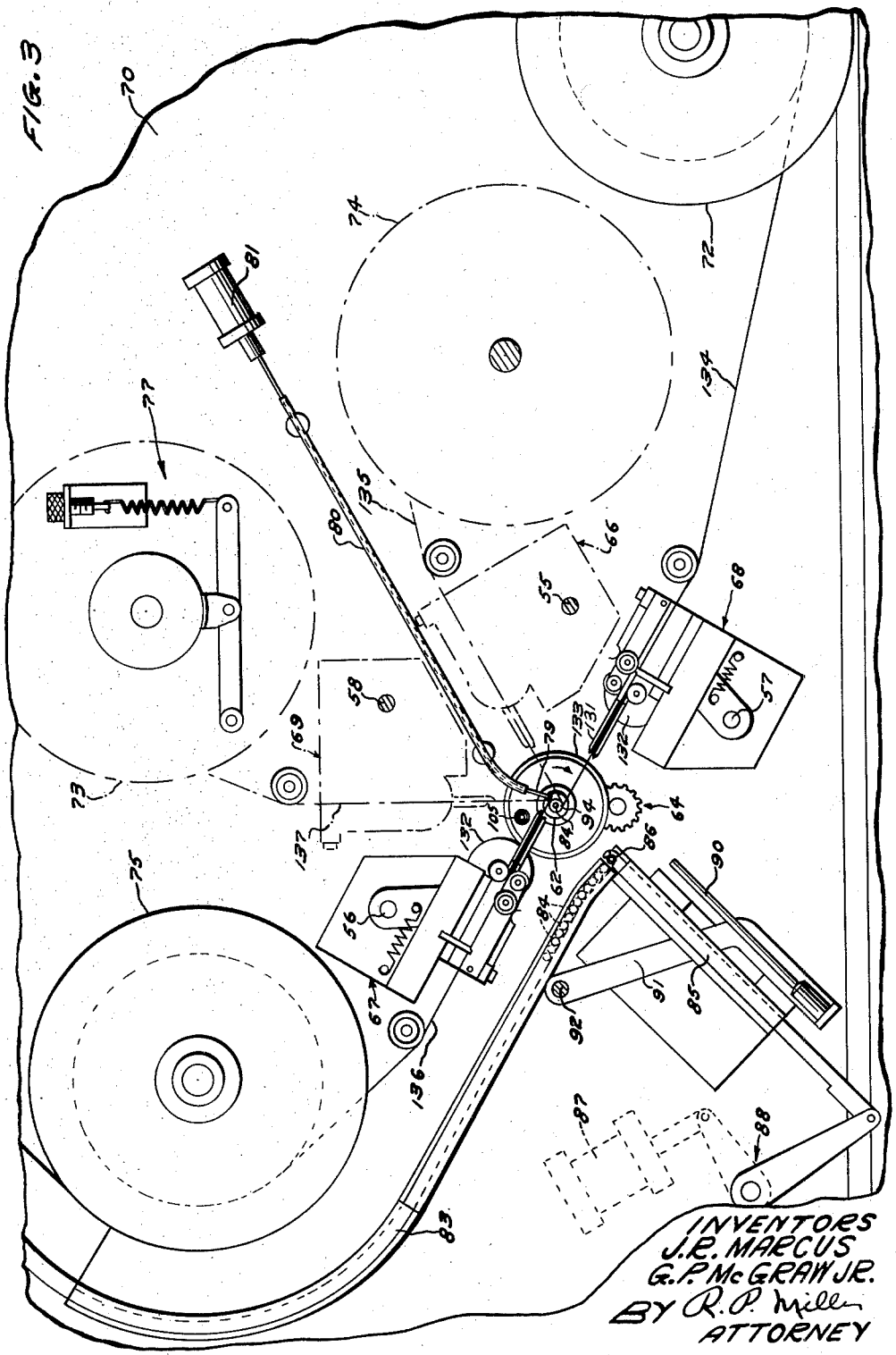
INVENTORS
J.R. MARCUS
G.P. McGRAW JR.
BY R.P. Miller
ATTORNEY

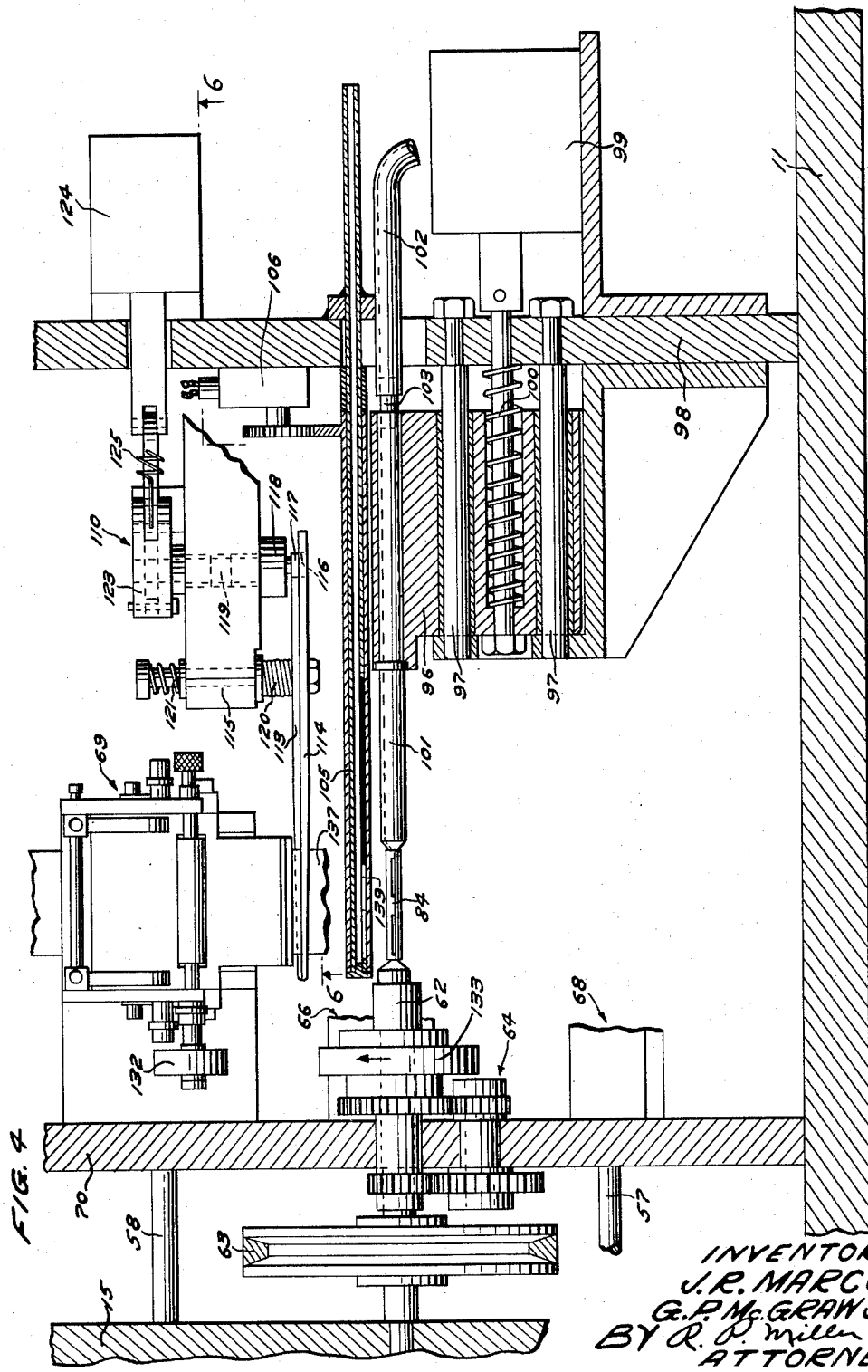

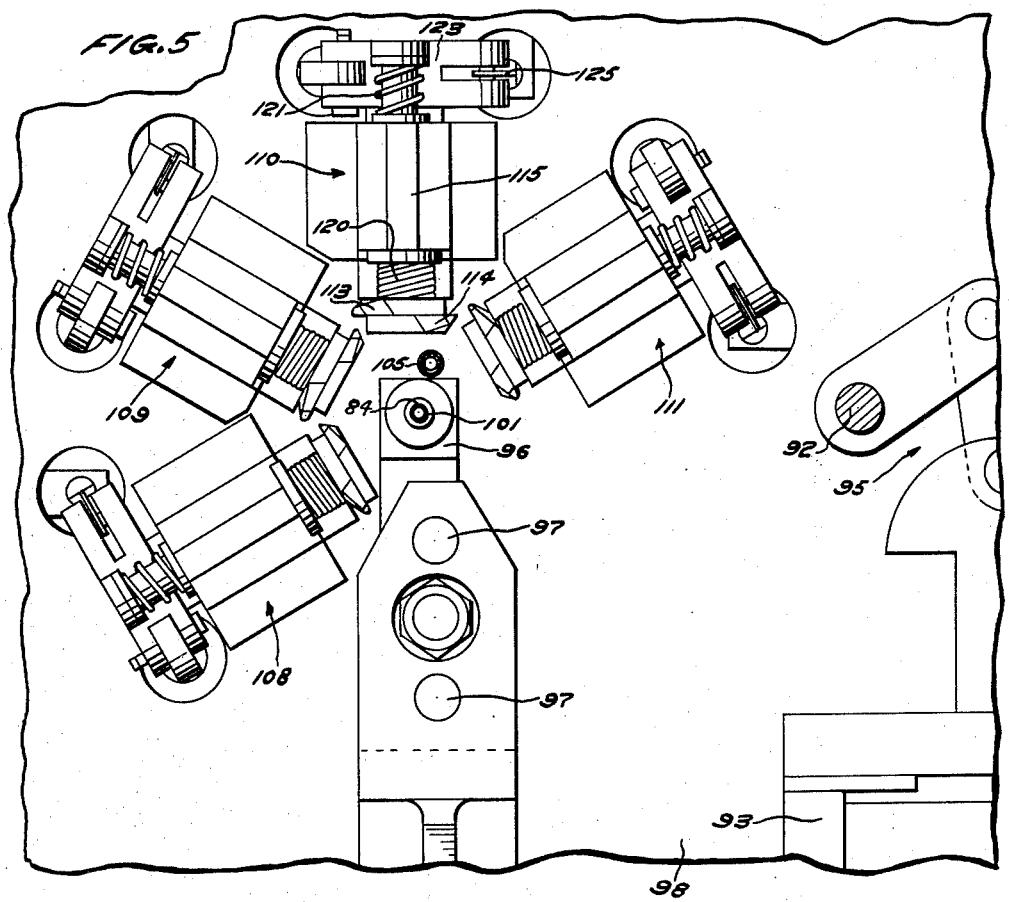
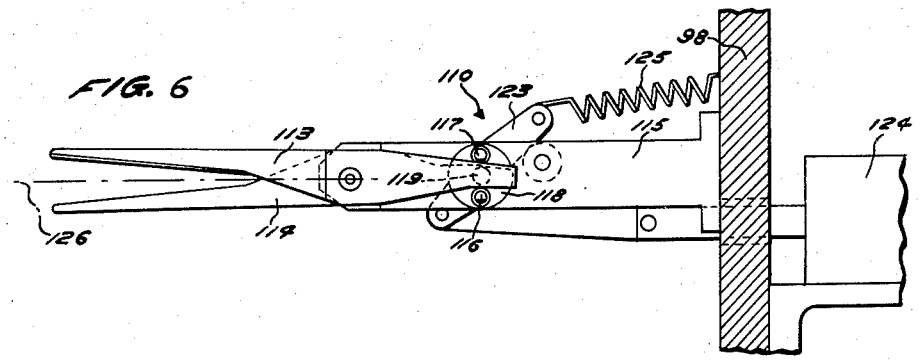

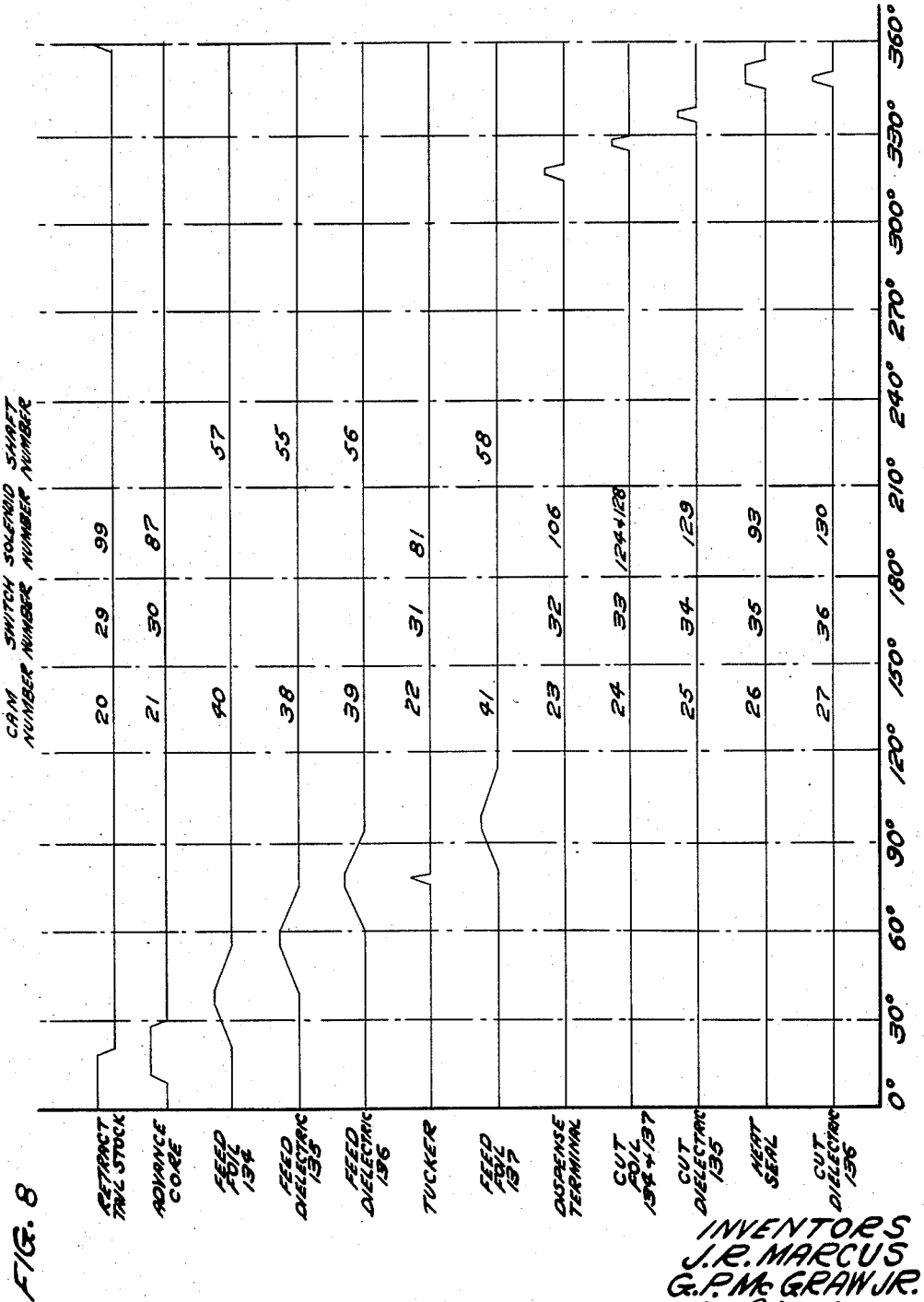

United States Patent Office 2,951,655
Patented Sept. 6, 1960

2,951,655

AUTOMATIC CAPACITOR WINDING MACHINE

Jerome R. Marcus, Chicago, and George P. McGraw, Jr., Downers Grove, Ill., assignors to Western Electric Company, Incorporated, New York, N.Y., a corporation of New York Filed Jan. 30, 1957, Ser. No. 637,154

3 Claims. (Cl. 242—56.1)

This invention relates to winding machines, and more particularly to an automatic machine for winding electrostatic capacitors.

In the present invention, the disclosed apparatus has been designed to wind material to form electrostatic capacitors, but it will be manifest from the following description that the invention is equally applicable to the winding of materials to form various other types of articles.

In the manufacture of telephone central office equipment, large quantities of electrostatic capacitors of various capacitances are utilized. These capacitors are generally fabricated by winding alternate layers of conductive foil and dielectric material upon a winding arbor or capacitor core. One or more terminals are generally inserted between the layers as the capacitor is being wound to provide means for connecting the capacitors into electrical networks.

Prior to this invention, it was customary to wind capacitors on semi-automatic machines. An operator was required to re-attach the webs of foil and dielectric to the winding arbor and to either hand feed the terminals or hand load a terminal dispensing device. Manifestly, hand operations such as these must be minimized if capacitors are to be produced at a high rate of speed.

It is therefore a principal object of this invention to provide a winding machine which will periodically re-cycle without a need for human intervention.

It is another object of this invention to provide a capacitor winding machine which is capable of winding capacitors of different sizes.

It is a further object of this invention to provide a capacitor winding machine equipped with automatic devices for feeding cores, terminals, and foils of conductive and dielectric materials.

With these and other objects in view, the present invention contemplates a mechanism for supporting and rotating capacitor cores and a core feed device associated therewith. Feeders are provided to advance webs of conductive foil and dielectric to the rotating core and a vacuum device is employed to hold the extremity of the first web against the core. The remainder of the webs are successively fed into the space between the adjacent web and the rotating core and are thus attached to the core. A terminal dispensing device is positioned between two of the webs and adjacent the rotating core to drop a terminal between the webs whereby the terminal is wound into the body of the capacitor. Shearing devices are provided to sever the webs when the capacitor is completed and a heated member is utilized to seal the severed ends of the webs to the capacitor body to prevent unwinding. A common drive mechanism is provided to sequentially operate the aforementioned devices in a predetermined timed relationship.

Other objects, advantages, and novel features of the invention will become apparent upon consideration of the following detailed description in conjunction with the accompanying drawings wherein:

Fig. 2 is a side elevational view looking in the direction of the arrows 2—2 of Fig. 1;

Fig. 3 is an enlarged sectional view taken along the line 3—3 of Fig. 1 illustrating the positions of the web feeders, terminal feeder, core feeder, and tucker relative to the winding station;

Fig. 4 is an enlarged sectional view taken along the line 4—4 of Fig. 1 illustrating the positions of the terminal feeder, a web feeder, and the web shear relative to a slotted capacitor core supported between the winding shaft and a live center and also the means for reciprocating the live center;

Fig. 5 is an enlarged sectional view taken along the line 5—5 of Fig. 2 illustrating the positions of the shears relative to the core and terminal feed;

Fig. 6 is a view illustrating a typical shearing mechanism taken along the line 6—6 of Fig. 4;

Fig. 7 is a perspective view of a completed capacitor which has been wound by using the present invention; and Fig. 8 is a cam chart illustrating the timing and the operating sequence of the various mechanisms comprising the present invention.

Figure 1:
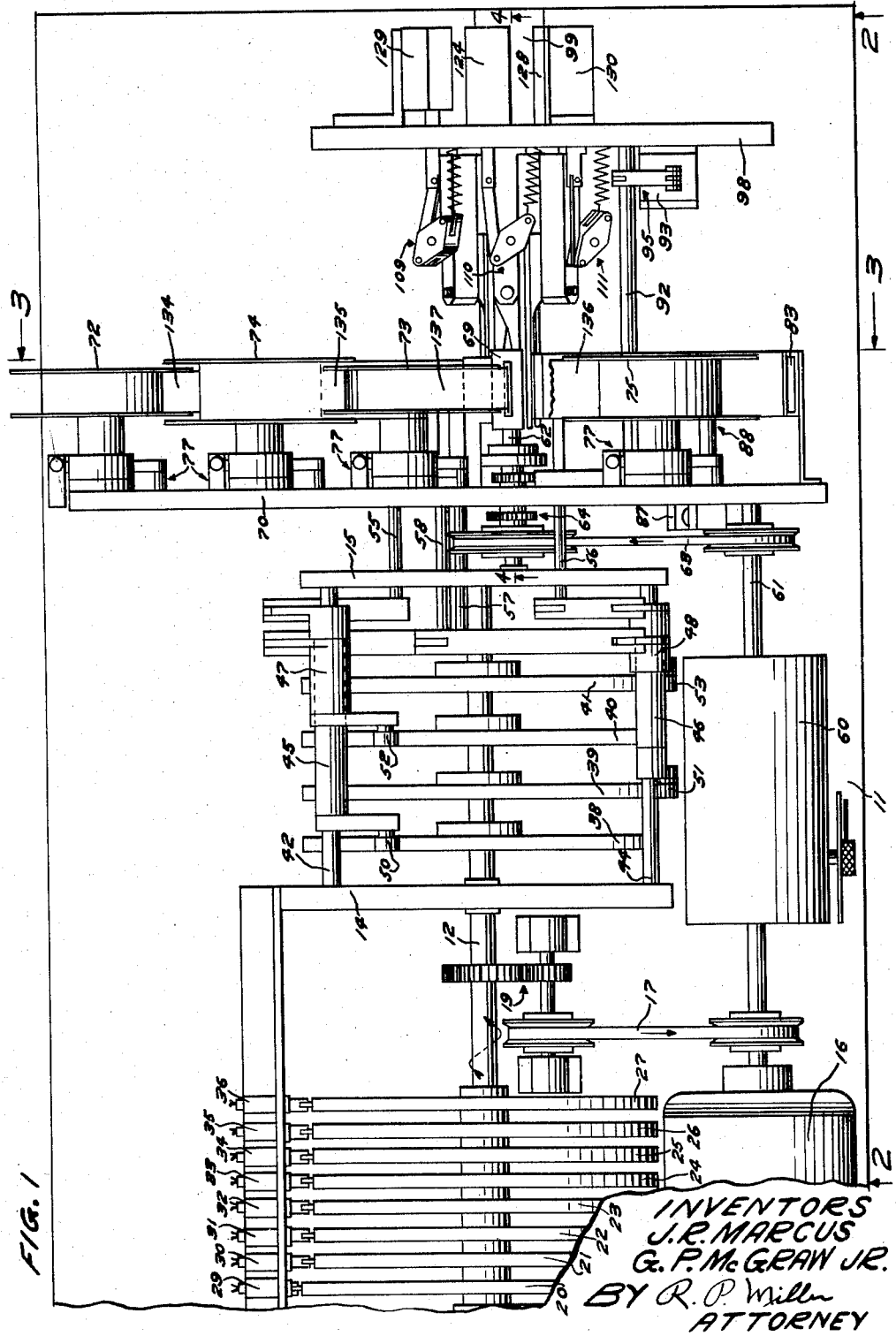
Fig. 1 is a top plan view of an automatic capacitor winding machine embodying the principal features of the invention.

Attention now is directed to the drawings wherein like numerals of reference designate like parts throughout the several views and in particular to Figs. 1 and 2 wherein is disclosed a base 11 and a master camshaft 12 rotatably mounted above the base by means of camshaft supporting plates 14 and 15. A motor 16 drives the camshaft 12 through belt 17 and gears 19. The camshaft 12 carries a set of control cams 20, 21, 22, 23, 24, 25, 26 and 27 which are used for actuating normally-open microswitches 29, 30, 31, 32, 33, 34, 35 and 36 to energize solenoids for controlling the functioning of the various component mechanisms in the capacitor winding machine. The camshaft 12 also has feed cams 38, 39, 40 and 41 fixed thereon. A pair of shafts 42 and 44 are secured to the plates 14 and 15 and support offset bell-cranks 45, 46, 47 and 48; the cranks 45 and 46 being rotatably mounted on the shafts 42 and 44, respectively, and the cranks 47 and 48 being concentric with and rotatably mounted on the cranks 45 and 46, respectively. The bell cranks 45, 46, 47 and 48 are provided on first extremities thereof with cam followers 50, 51, 52 and 53, respectively, which are in rolling contact with the feed cams 38, 39, 40 and 41, respectively. The second extremities of the bell cranks 45, 46, 47 and 48 are connected through suitable linkages to web feeder shafts 55, 56, 57 and 58, respectively, and are adapted to impart rotative movement to these shafts upon movement of the cranks.

A variable speed transmission 60 is secured to the base 11 and is also coupled to the output shaft of the drive motor 16. The output shaft 61 of the transmission drives a winding center 62 through belt 63 and gear train 64. The variable speed transmission enables the production of capacitors of different sizes by permitting the ratio of winding speed to camshaft speed to be varied. This ratio determines the lengths of material to be wound. The transmission further permits adjustment of the capacitance of any given size of capacitor being wound should the capacitance be different than the desired nominal value due to slight variations in the thickness of the conductive foil or the dielectric material.

Referring now to Fig. 3 there can be seen a plurality of web feeders 66, 67, 68 and 69 which are secured to a feeder plate 70. These web feeders are actuated by web feeder shafts 55, 56, 57 and 58 in a manner described with great particularity in a co-pending application of G. P. McGraw, Jr. filed January 30, 1957, Serial No.

637,163. These shafts correspond to the shafts numbered 46 in the aforementioned co-pending application.

Spools 72 and 73 containing conductive foil and spools 74 and 75 containing dielectric material are all rotatably mounted upon shafts fixed to the feeder plate 70. These spools are each provided with a simple adjustable brake such as that designated generally by the reference numeral 77 as a means of controlling the tension in the webs as they are withdrawn from the spools by the feeders or the winding device. A thin strip of pliant material 79 is slidable within a tubular member 80 and is adapted to be reciprocated within the member 80 by a solenoid 81 to tuck the end of the web being fed by the feeder 67 into a position where it will be picked up by the winding device.

A gravity feed core chute 83 is secured to the feeder plate 70 and is supplied with hollow, slotted capacitor cores 84 by a suitable device. A core feed slide 85 is reciprocably mounted on the feeder plate 70 and is provided with a core receiving notch 86 which is in registry with the lower end of the chute 83 when the slide is in its retracted position. The slide 85 is so positioned that the cores 84 within the chute 83 are prevented from falling from the chute at any time when the notch 86 is not in registry therewith. A solenoid 87 and linkage 88 are provided to effect reciprocation of the slide 85 toward and away from the winding station.

A sealing device formed of an enclosed heating element 90 and a support arm 91 are rigidly secured to a rotatable shaft 92. A solenoid 93 (Figs. 1 and 2) is provided to oscillate the shaft 92 through an appropriate linkage 95. The heating element 90 is used to fuse several layers of dielectric wound on the outside of the completed capacitor 94 (Fig. 7) together to prevent the webs from unwinding.

Referring now to Fig. 4, there can be seen a tailstock 96 reciprocably mounted on slide rods 97 which are secured to a back plate 98. A solenoid 99 is provided to retract the tailstock 96 and is opposed by a compression spring 100 which normally advances the tailstock whenever the solenoid is de-energized. This spring and solenoid arrangement permits a limited range of core lengths to be accommodated. If it is desirable to use longer cores, the back plate 98 can be made adjustable relative to the feeder plate 70. The tailstock 96 carries a hollow live center 101 which is connected to a flexible hose 102 by means of a coupling 103. The coupling may be of any suitable type which would permit rotation of the live center 101 while the hose 102 remains stationary. The hose 102 is connected to a vacuum pump (not shown) to permit a partial vacuum to be created within the hollow core 84 which is held between the winding center 62 and live center 101.

A terminal dispensing device 105 is fixed to the back plate 98 in a position just above the top of the tailstock 96. A rotary solenoid 106 is provided to actuate the dispenser 105 in a manner more fully described in a second co-pending application of G. P. McGraw, Jr. filed January 30, 1957, Serial No. 637,155. The dispensing device 105 and rotary solenoid 106 correspond to the slotted concentric tubes 41, 44 and rotary solenoid 45 disclosed in this co-pending application. The invention described in the aforementioned co-pending application can be used in conjunction with the present invention to form capacitor terminals and automatically dispense them to the winding device as required.

Attention now is directed to Figs. 5 and 6 wherein a plurality of shearing devices 108, 109, 110 and 111 are disclosed as being secured to the back plate 98 and projecting toward the feeder plate 70 (Figs. 1 and 2). Inasmuch as these shearing devices are identical the description of one is deemed sufficient.

A pair of shearing blades 113 and 114 are pivotally mounted on a supporting bracket 115 (Fig. 6). A pair of actuating pins 116 and 117, carried by a disc 118 on the end of a shaft 119, are in abutting engagement with the rearward extremities of the shearing blades 113 and 114, respectively. A torsion spring 120 (Figs. 4 and 5) is provided to urge the blades open and hence maintains the rearward extremities in engagement with the pins 116 and 117. A compression spring 121 (Fig. 4) is provided to hold the blades 113 and 114 together. A rocker arm 123 is fixed to the other end of the shaft 119 and is connected through suitable linkage to an operating solenoid 124 which is opposed by a tension spring 125. This arrangement enables the shearing blades to cut along the center line 126 which is in the path of travel of the web and thus insures that the web will be cut instead of torn. Solenoids 128, 129 and 130 are provided on the rear of the back plate 98 to operate shearing devices 108, 109 and 111, respectively (Figs. 1 and 2).

*Operation*

In order that a better understanding of the invention may be had, its mode of operation will now be described; with particular reference to Fig. 8. The numbers in the center of the cam chart indicate the cam, microswitch and solenoid or cam and shaft which control the performance of the various operations set forth at the left in the chart.

At the start of a winding cycle the control cam 20 is positioned to close the normally-open contacts of the microswitch 29 (Fig. 1). With this switch closed, the solenoid 99 is energized and the tailstock 96 is held in its retracted position (to the right of the position shown in Fig. 4). As the cam shaft 12 rotates in the direction indicated by the arrow in Fig. 1, control cam 21 closes the normally-open contacts of microswitch 30 to energize solenoid 87 while the tailstock is still held in its retracted position. Energization of solenoid 87 advances the core feeder slide 85 to a position where a capacitor core 84, resting in the core receiving notch 86, is axially aligned with the winding center 62 and live center 101. Continued rotation of the cam shaft 12 causes cam 20 and switch 29 to de-energize solenoid 99 and permit the tailstock 96 to advance under the influence of the compression spring 100 and cause the core 84 to be gripped between the rotatable centers 62 and 101 (Fig. 4). The core 84 and live center 101 immediately begin to rotate due to the fact that the winding center 62 is being continually driven by the drive motor 16 through the variable speed transmission 60 and the associated drive train. As the cam shaft 12 continues to rotate, cam 21 and switch 30 de-energize solenoid 87 to permit the core feeder slide 85 to retract.

Bell crank 47 is next actuated by feed cam 40 to pivot feed shaft 57 and thus advance feeder 68 toward the rotating core 84. The duck bill guides advance between the open shearing blades 113 and 114 during this movement. As the feeder 68 reaches its advanced position, feed roller 132 frictionally engages the rotating drive roller 133 (Fig. 4) and advances the web of conductive foil 134, emanating from the spool 72, through a duck bill guide 131 and toward the rotating core 84 in the manner described in the aforementioned co-pending application of G. P. McGraw, Jr., filed January 30, 1957, Serial No. 637,163. The rollers 132 and 133 correspond to the rollers numbered 52 and 39, respectively, in the aforementioned application. As the extremity of the web 134 emerges from between the duck bill guides 131 on the feeder 68, the inrush of air through the slots formed in the core 84 (Fig. 4) as a result of the partial vacuum therein presses the end of the web against the core. The end of the web 134 then begins to rotate with the core 84. After the core has made several turns the end of the web is firmly held thereon by the overlaying turns of foil. In this manner, the conductive foil 134 makes electrical contact with the core 84 to which a terminal is later attached. Feeder 68 then returns to its rest position.

Feeder cam 38 next advances feeder 66 through shaft 55 to begin feeding a web of dielectric material 135 toward the core 84. The extremity of the web is inserted into the space between the web of conductive foil 134 and the rotating core 84 and wedged therein. This permits the end of the web 135 to be picked up by the rotating core and to be wound thereon in a position underlying the conductive foil 135. Feeder 66 is then retracted to its rest position.

A second web of dielectric material 136 is then advanced toward the core 84 through the action of feed cam 39 and web feeder 67. Due to the angle of approach of the feeder 67, the extremity of the web 136 will not normally enter the space between the web 135 and the rotating core 84. To effect this entry, control cam 22 closes switch 31 to energize solenoid 81 which advances the strip of pliant material 79. The strip 79 tucks the end of the web 136 into the space between the web 135 and the rotating core 84 so that the web 136 may be picked up in the same manner as was the web 135. The feeder 67 and tucker 79 then return to their rest positions.

A second web of conductive foil 137 is then advanced through the cooperation of feed cam 41 and feeder 69 into the junction formed by the engagement of webs 135 and 136 to be wedged therebetween in the same manner as were the other webs.

With all four webs attached to the core and being wound thereon, the machine runs until the capacitor is almost completely wound. At this time, control cam 23 closes switch 32 which energizes rotary solenoid 106. The terminal dispenser 105 then releases a terminal 139 which falls into the junction formed by the engagement of webs 136 and 137 (Fig. 4) and is wound into the capacitor as described in the aforementioned co-pending application of G. P. McGraw, Jr., filed January 30, 1957, Serial No. 637,155. The terminal forming and dispensing apparatus described in the above application may be tied in with the present invention in any suitable manner. It is only necessary that terminals be formed with sufficient speed that they are available at the dispenser when required.

After several turns have been wound with the terminal 139 therein, control cam 24 closes switch 33 to energize solenoids 124 and 128. These solenoids operate shearing devices 110 and 108, respectively, to sever the two webs 137 and 134 simultaneously. Shortly thereafter, control cam 25 closes switch 34 to energize solenoid 129. This solenoid then actuates shearing device 109 which severs web 135.

Control cams 26 and 27 then close switches 35 and 36 to energize solenoids 93 and 130, respectively. Solenoid 93 pivots shaft 92 to move the heating element 90 into engagement with the rotating core as solenoid 130 energizes shearing device 111 to sever web 136. The heating element 90 is held in contact with the rotating capacitor for several turns thereof after the web 136 has been cut. This causes several layers of dielectric material to fuse together and thus prevents the capacitor from unwinding.

After the heat sealing has been completed, control cam 20 closes switch 29 to energize solenoid 99. This solenoid retracts the tailstock 96 and permits the completed capacitor 140 (Fig. 7) to fall from between the winding centers into a suitable receptacle and thus complete the cycle. A second terminal may then be attached to the core 84 and the body of the capacitor encapsulated with a dielectric material to form a solid unit.

Manifestly, the present invention is easily adaptable to the winding of coreless capacitors wherein both terminals are wound into the body of the capacitor. The core 84 of the present invention would be replaced by a conventional split arbor which was provided with vacuum slots similar to those now provided in the core 84. A second terminal dispenser would be provided to dispense a second terminal so that it would be wound into the body of the capacitor in electrical contact with the conductive foil which now makes electrical contact with the core (foil 134).

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A winding apparatus for very thin flexible webs comprising a plurality of web supply means, means for advancing a first web from one of said supply means, means for winding said advanced web, means for sequentially advancing the extremities of the webs from the remaining supply means into proximity with said winding means, each of said advancing means including a thin flat guide for supporting the webs in close proximity to said winding means, and means included in each advancing means and operable by said winding means while each advancing means is in proximity with said winding means for further advancing said webs to insert the extremities of the webs into junctions formed by the webs being wound and the convolutions already wound.

2. A winding apparatus for thin pliant webs comprising a plurality of web supply means, means for gripping and advancing a first web from one of said supply means, means for winding said advanced web, means for sequentially gripping and advancing the extremities of the webs from the remaining supply means into proximity with said winding means, each of said gripping means including a thin flat guide for supporting the webs in close proximity to said winding means, means for advancing each gripping means, and means included in each gripping means and operable by said winding means while each gripping means is in an advanced position for further advancing said webs to insert the extremities of the webs into the junctions formed by the webs being wound and the convolutions already wound.

3. In a capacitor winding machine, a pair of spaced winding centers, a drive means for rotating one of said centers, means for mounting said other center for axial reciprocatory movement, a chute spaced from and in alignment with the space between said winding centers for holding a stack of cores, a slide for receiving cores from said chute, means operated by said drive means for periodically reciprocating said slide to advance a core to said winding centers, means operated by said drive means for periodically reciprocating the other of said centers to grip each core advanced by said slide and release a core previously advanced, a plurality of sources of thin pliant material circumferentially spaced about said centers, means actuated by said drive means following a reciprocation of said slide for sequentially advancing ends of said thin pliant material from said sources to each advanced core, means for holding the first advanced thin pliant material to said core, a thin guide mounted on the advancing means associated with the subsequently advanced ends of pliant material for guiding said thin pliant material into the junctions of the convolutions of material wound on said core, a plurality of severing means adapted to sever said material, and means actuated by said drive means just prior to a reciprocation of said center for operating said severing means.

References Cited in the file of this patent

UNITED STATES PATENTS

| | | |
|---|---|---|
| 1,963,381 | Purdy | June 19, 1934 |
| 2,001,347 | Holmes | May 14, 1935 |
| 2,520,826 | Beck | Aug. 29, 1950 |
| 2,692,090 | Watson | Oct. 19, 1954 |
| 2,724,562 | Purdy | Nov. 22, 1955 |
| 2,740,592 | Larsen et al. | Apr. 3, 1956 |
| 2,904,276 | Wellington | Sept. 15, 1959 |